United States Patent [19]

Ferraro

[11] Patent Number: 5,259,299
[45] Date of Patent: Nov. 9, 1993

[54] NON-STICK OUTDOOR COOKING UNIT

[76] Inventor: Frank A. Ferraro, 104 Garwood Rd., Trumbull, Conn. 06611

[21] Appl. No.: 950,974

[22] Filed: Sep. 23, 1992

Related U.S. Application Data

[63] Continuation of Ser. No. 702,926, May 20, 1991, abandoned.

[51] Int. Cl.⁵ ............................................. A47J 37/07
[52] U.S. Cl. ........................................ 99/340; 99/445; 99/446
[58] Field of Search ............... 99/444, 445, 446, 450, 99/375, 400, 425, 374, 328, 333, 482, 340; 126/25 R

[56] References Cited

U.S. PATENT DOCUMENTS

| | | | |
|---|---|---|---|
| 1,135,857 | 4/1915 | Smith | 99/445 |
| 1,591,291 | 7/1926 | Detwiler | 99/450 |
| 3,092,015 | 6/1963 | Tucker et al. | 99/446 |
| 3,199,438 | 8/1965 | Myler et al. | 99/446 |
| 3,330,204 | 7/1967 | Little | 99/425 |
| 3,443,510 | 5/1969 | Norton | 99/445 |
| 4,658,710 | 4/1987 | Quet et al. | 99/445 |
| 4,700,618 | 10/1987 | Cox, Jr. | 99/482 |
| 4,899,724 | 2/1990 | Kuechler | 99/329 R |
| 4,909,137 | 3/1990 | Brugnoli | 99/446 |
| 4,930,491 | 6/1990 | Purello | 99/425 |
| 5,000,085 | 3/1991 | Archer | 99/445 |

Primary Examiner—Harvey C. Hornsby
Assistant Examiner—Reginald L. Alexander
Attorney, Agent, or Firm—Bachman & LaPointe

[57] ABSTRACT

An outdoor cooking unit having a cooking surface and a separate grease collecting unit where the cooking surface is coated with an anti-stick compound such as TEFLON and the unit is designed and constructed to preclude overheating the anti-stick coating.

5 Claims, 6 Drawing Sheets

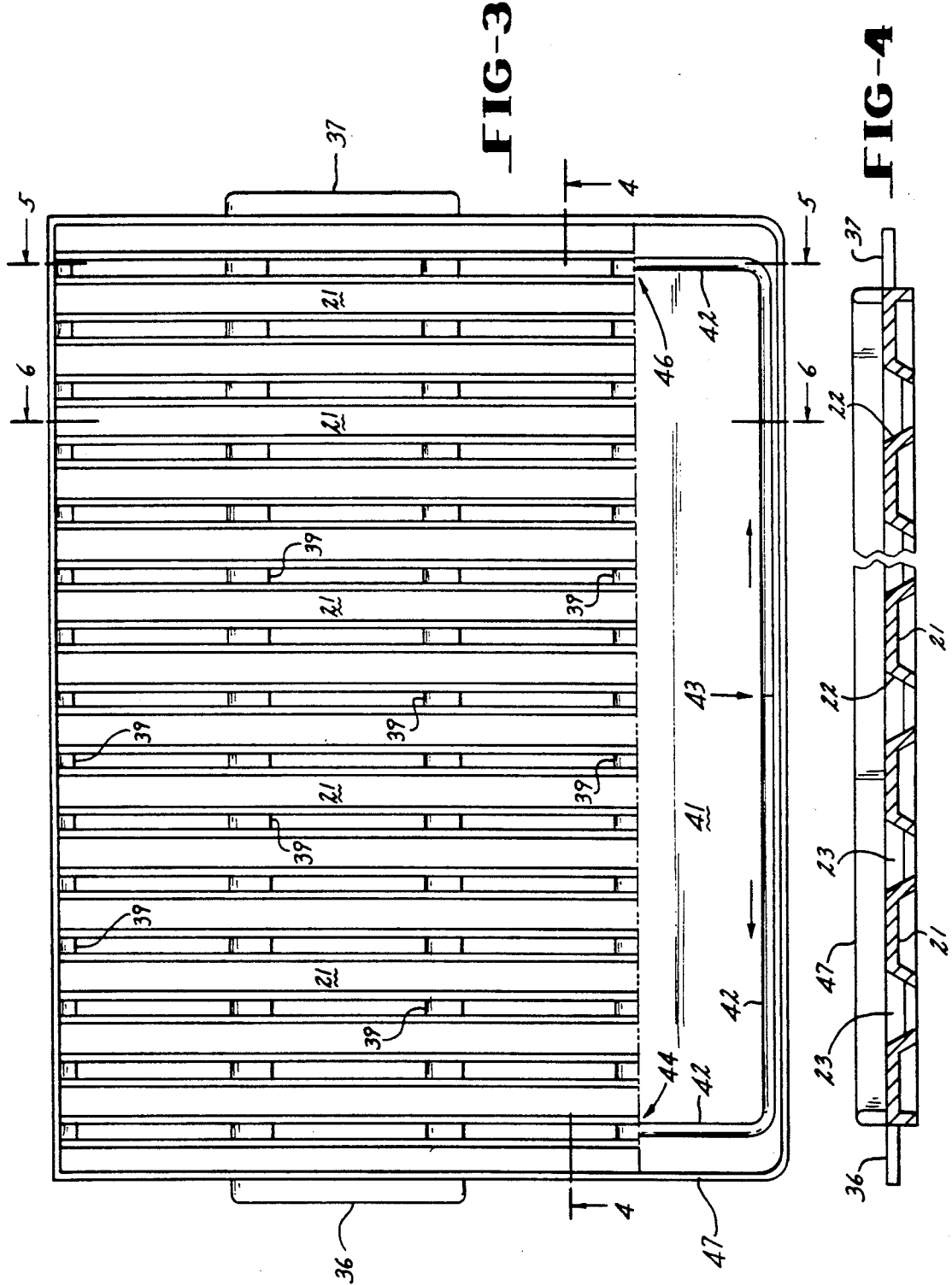

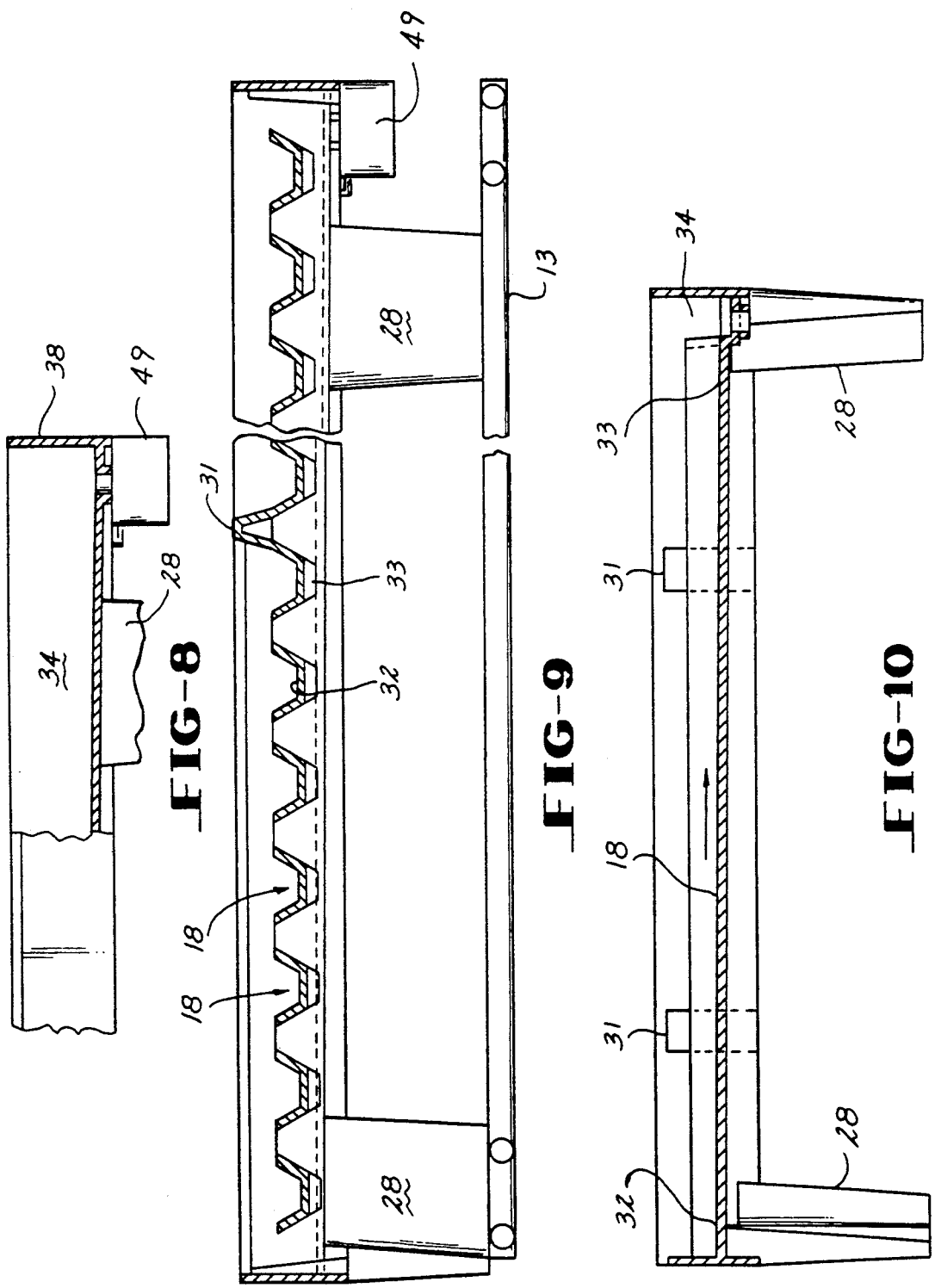

NON-STICK OUTDOOR COOKING UNIT

This is a continuation of co-pending application Ser. No. 07/702,926 filed on May 20, 1991 now abandoned.

BACKGROUND OF THE INVENTION

The present invention relates to outdoor cooking units and relates in particular to such units which are fired by ordinary charcoal briquettes or by lava rock briquettes which are fired by an auxiliary heat source such as a propane or other natural or synthetic gas burner.

The invention also relates to the use of anti-stick coatings applied to the cooking surface where the structure and operation of the cooking unit is designed to avoid overheating the anti-stick coating and to preclude direct flame contact with the anti-stick coating.

The use of anti-stick coatings such as tetrafluoroethylene, marketed under the trademark TEFLON, or other fluorocarbon polymers in outdoor cooking grill applications have been avoided because of the high temperatures produced by gas grill heat sources. The temperatures reached on the cooking grates of gas grills are approximately 900° F. when measured in extreme conditions such as with the top cover closed. This has precluded the use of fluorocarbons such as "TEFLON" non-stick surfaces for this application under the standard configurations. The reason is that the polymer will degrade at these temperatures, give off fumes which may cause polymer fume fever, a flu-like fever. The properties of these resins are such that the acceptable usable temperatures are 500° F. for continuous service. Also the contact by fire may decompose the resins and produce toxic fumes. To consider the use of the fluorocarbons in this application, these two areas must be avoided, high temperatures and no contact with fire. To accomplish this some modifications to the process must be incorporated.

SUMMARY OF THE INVENTION

Therefore it is a prime feature o the present invention to provide an outdoor cooking unit having an anti-stick coating where the structure and operation of the unit is free of the risk of decomposing or burning the anti-stick coating.

A further feature of the invention is the provision of a coated cooking unit which can be placed upon the cooking grate (metallic rods) of an existing outdoor grill.

Alternately, the cooking unit of the present invention may be incorporated permanently or removably in a firebox and frame structure designed specially for the cooking unit of the present invention.

It is a further object of the invention to provide vertical spacing between individual elements of the cooking unit and between the cooking unit as an assembly and its heat source to insure adequate atmospheric air venting ("make up air") and to enhance the flow of hot air to a cooking surface effective to deter build up of excessively high temperatures on the cooking surface.

It is a further feature of the invention to limit the temperature of the cooking surface of the cooking unit to a range of 400° to 500° F.

A further feature of the invention relates to the judicious selection of metals, design and fabrication of metal piece parts with emphasis upon heat absorption, "heat sink", heat conductivity and heat radiation characteristics.

A further feature of the invention is the provision of a cooking unit having an anti-stick coating where contact between the coating and an open flame is blocked.

A still further feature of the invention is the provision of a composite cooking unit having a first (top) element defining a cooking surface and a second cooperating (bottom) element defining a cooking grease collector.

It is a further feature of the invention that both said elements define a series of alternating lands and recesses or troughs wherein the lands of the top element support the items being cooked and the recesses of the top element define conduits or paths for directing cooking grease to the closed recesses or troughs of the bottom element.

A further feature of the invention is the provision of openings in the lands of the bottom element for directing hot air or hot gases to the underside of the lands of the top element to effect a cooking operation.

The lands and recesses of the top element are in register with the lands and troughs of the bottom element thereby blocking open flame contact with the anti-stick coating directly or with the piece parts so coated.

It is a further feature of the present invention that the cooking unit be operated open to the atmosphere, i.e., uncovered to preclude the build-up of temperatures which would decompose the anti-stick coating.

That is, when the cooking unit of the present invention is an adjunct, "add-on", to an existing outdoor grill device having a grate and a cover, the dimensions and design of the present cooking unit is such that closure of the grill device is precluded.

A further feature of the present invention is that the top element is separable from the bottom element to facilitate cleaning and storing.

A further feature of the invention is the provision of cooking unit structure which precludes "flame flare up" resulting from cooking grease being ignited.

A further feature of the invention is the provision of sloped ramps, troughs or conduits in the grease collector unit directing the flow of grease to a sump and thence to a removable collector located remotely to avoid the risk of ignition.

It is a further feature of the present invention to block dripping or spattering of grease upon artificial (lava rock, ceramic or the like) briquettes thereby prolonging the useful life of such briquettes.

An outdoor cooking unit embracing certain principles of the present invention may comprise means for generating heat, plate means providing a cooking surface, grease collecting means, said plate means defining a plurality of lands and recesses and said grease collecting means defining a plurality of lands and troughs, the lands and recesses of said plate means being disposed above and in substantial registration with the lands and troughs, respectively, of said grease collecting means, and drain means in the recesses of the plate means whereby cooking grease flows from said plate means to the troughs of said grease collecting means.

Other features and advantages of the present invention will become more apparent from an examination of the succeeding specification when read in conjunction with the appended drawings, in which;

BRIEF DESCRIPTION OF THE DRAWINGS

FIG. 3 is a plan view of the plate means, FIG. 4 is a sectional view of FIG. 3 in the plane of the line 4—4 as viewed in the direction of the arrows.

FIG. 8 is a partial vertical section of FIG. 7 in the staggered planes of line 8—8 as viewed in the direction of the arrows showing the side configuration broken away to show the grease sump and its drain opening.

FIG. 9 is a sectional view of FIG. 7 as viewed in the plane of the line 9—9 and in the direction of the arrow.

FIG. 10 is an end elevation of the right side of FIG. 7, and

DESCRIPTION OF THE PREFERRED EMBODIMENT

Figure 1:
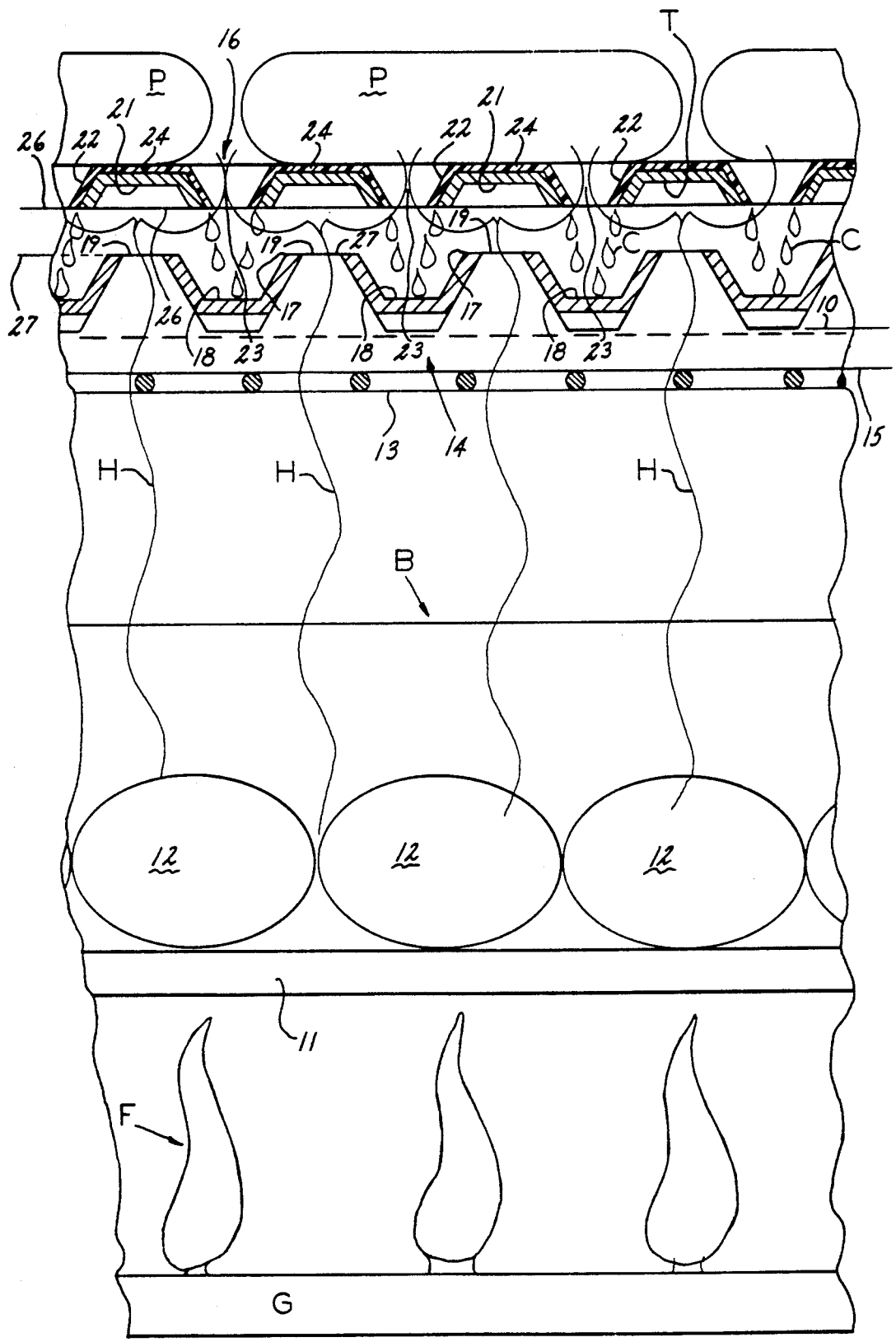
FIG. 1 is a schematic illustration of a vertical section showing the cooking unit of the present invention adapted to and resting upon the cooking grate of an existing gas fired grill.

Referring in detail to the drawings, FIG. 1 shows, schematically, a vertical section of an outdoor cooking unit incorporating the present invention wherein a plate or grid 11 supports briquettes 12 fired by flame F originating at gas burner G.

At the outset, it is well to understand that the invention is not limited as to type or source of heat.

In FIG. 1, the briquettes are fabricated of non-flammable lava rock, ceramic or like material. The cooking unit will operate equally effectively if the source of heat originates with electric heating coils, ordinary charcoal, charcoal briquettes, cannel coal or wood.

As will be more apparent as the specification proceeds, when the source of heat originates with a fuel that is susceptible of flow control, such as is the case with propane, gasoline or other synthetic or natural gases or fluids, the present invention includes control means responsive to temperature for regulating the flow and thus the heat generated by such fuels.

Above the briquettes 12 and spaced vertically therefrom, a conventional grill 13 (grill upon which one normally cooks) supports an assembly comprising a metal grease collecting means 14 disposed below a metal plate means 16 which provides a cooking surface supporting items to be cooked such as meat patties P.

The grease collecting means 14 defines a plurality of lands 17 with intervening troughs 18 where the lands are formed with openings 19 to funnel heat H to the underside of the plate means 16.

Correspondingly, the plate means 16 is formed with alternating lands 21 and recesses 22 which fall into register with the lands 17 and troughs 18 of the grease collector means 14. That is, the lands 21 overlay the lands 17 and the recesses 22 are immediately above troughs 18.

The recesses 22 are formed with openings or drain means 23 whereby cooking grease C drains into the troughs 18 as shown in FIG. 1.

The lands 21 of the plate means 16 are coated with anti-stick material 24 such as polymers of tetrafluoroethylene and copolymers of tetrafluoroethylene and hexafluoropropylene. A commercial embodiment of one such coating is offered by El DuPont de NEMOURS under the trademark TEFLON.

In some existing grill structures to which the cooking unit of the present invention is adapted (such as shown in FIG. 1) it is optional to include a baffle or screen, indicated generally at B, to keep flame from igniting grease in the troughs 18.

Since many effective anti-stick coatings of the class described above tend to decompose at elevated temperatures releasing noxious or toxic fumes, it is imperative to keep the anti-stick coating free of contact with flame and to keep the coating temperature below 500° F.

This temperature level is controlled at the cooking surface by selected ranges of vertical spacing of individual elements of the cooking unit or an assembly of the cooking elements in at least 3 different arrangements, namely; (1) vertical spacing between the plate means 16 and the grease collector means 14, (2) vertical spacing between the assembled plate means and the grease collector means and the top of the existing cooking grates and/or (3) vertical spacing between the assembled plate and collector means and a designated level of a ventilated firebox designed specifically for the cooking unit.

Obviously, spacing is not a critical consideration when temperature of the cooking surface is controlled thermostatically.

Depending upon the mass of the metal, its heat absorption and heat radiation characteristics, it has been found that proper "make up" air and proper hot air flow necessary to keep the coated cooking surface temperature below 500° F. can be achieved by maintaining the vertical spacing between the plate means 16 and the grease collecting means 14 [arrangement (1)] in the range of from about ¼ inch to about 4 inches.

In arrangement (1), FIG. 1, the spacing is measured between two parallel planes; one plane 26 is defined by the termination of drain means 23 and the other plane 27 is defined by the lands 17 of the grease collecting means 14.

In arrangement (2), FIG. 1, spacing is measured between a plane 10 embracing the lowermost portion of the troughs 18 and a parallel plane 15 defined by the top of the grill grate 13 and ranges from ½ to 4 inches.

Figure 2:
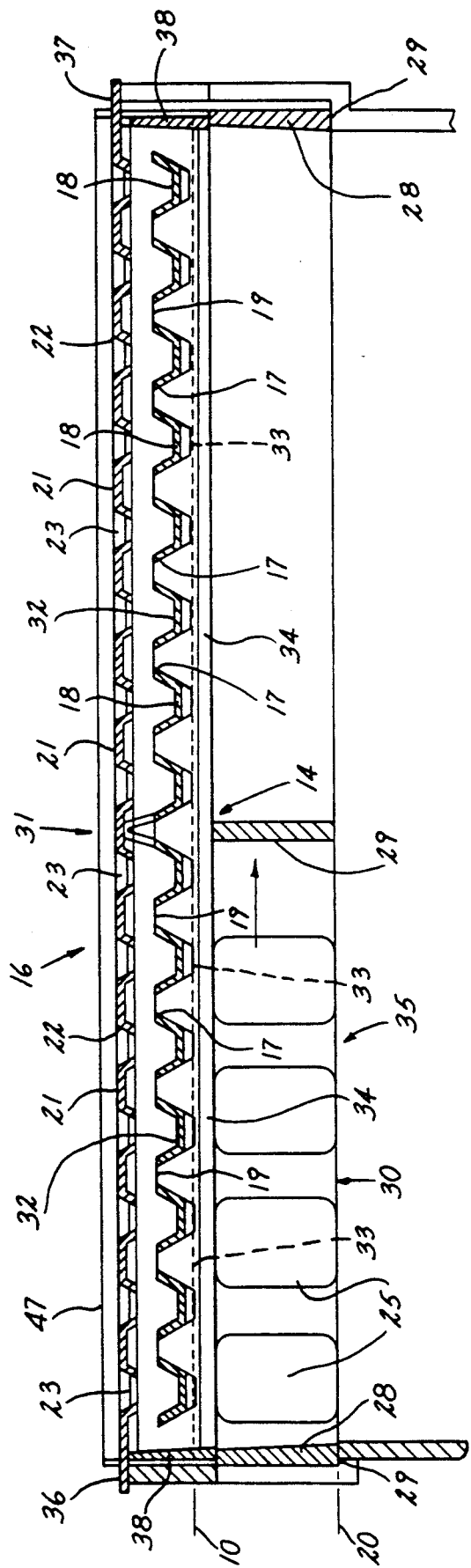
FIG. 2 is a vertical sectional view of the assembled plate means and grease collecting means disposed upon a ventilated firebox structure deigned specifically for the cooking unit of the present invention.
Figure 5:
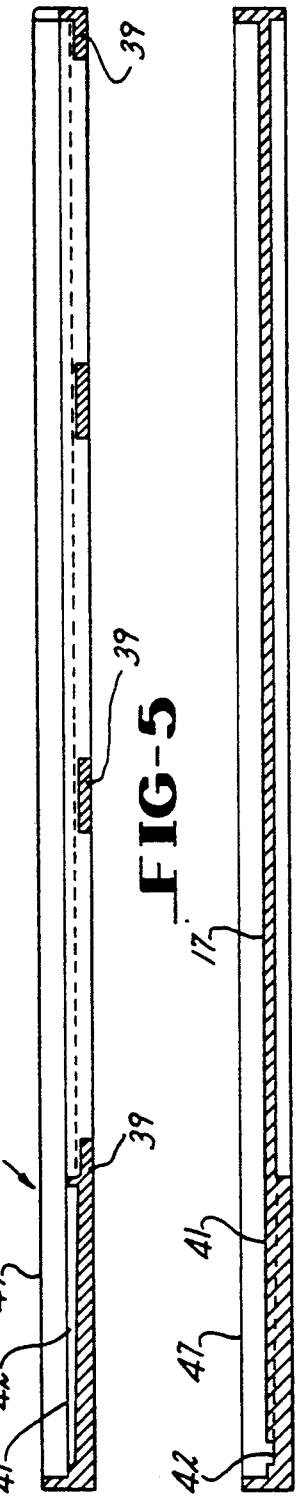
FIG. 5 is a section of FIG. 3 in the plane of the line 5-5 as viewed in the direction of the arrows.
Figure 6:
FIG. 6 is a section of FIG. 3 in the plane of the line 6—6 as viewed in the direction of the arrows.
Figure 7:
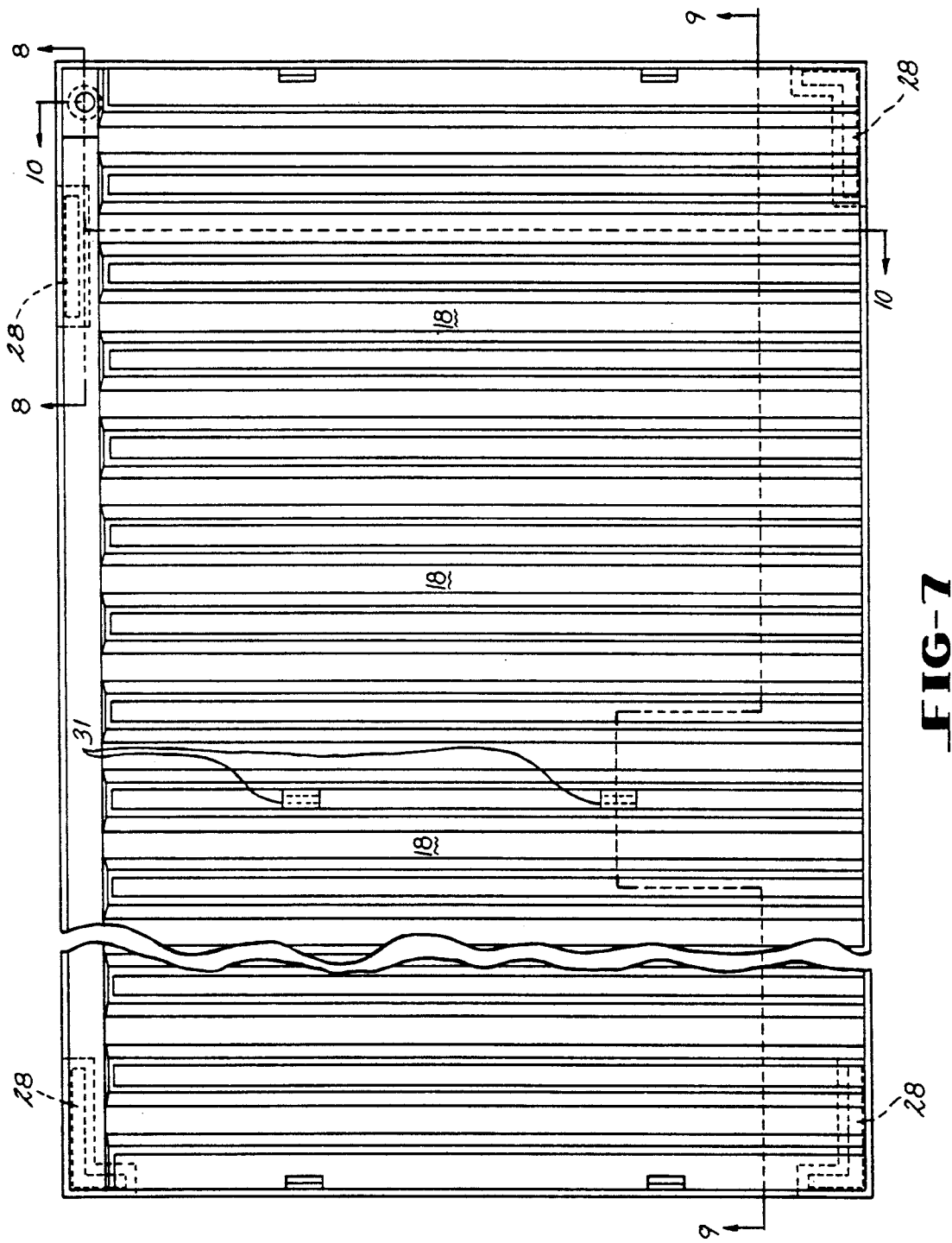
FIG. 7 is a plan view of the grease collecting means.

In arrangement (3), FIG. 2, spacing is measured from plane 10 to a parallel plane 20 defined by the bottom of ventilation openings 25 in side wall 30 of firebox 35 The preferred dimension ranges from ½ to 6 inches.

FIG. 2 is a sectional view of a typical outdoor cooking unit embracing the present invention in which the plate means 16 and the grease collector means 14, as a separable assembly are installed in the firebox 35 designed specifically to receive the assembly.

The plate means 16 is supported on vertical ribs 38 spaced about the interior of the firebox and includes ears 36 and 37 providing handles for lifting the plate means free of the underlying grease collector means.

The grease collector means is supported, in turn, by ribs 28 seated upon offsets or shoulders 29.

A central strut 31 projecting from a land 17 of the grease collector 14 engages the underside of a land 21 of the plate means to act as a stiffener.

As will be more apparent hereinafter the troughs 18 are inclined or pitched from a level identified by the reference numeral 32 to a lower level identified by the reference numeral 33 so that cooking grease drains into a sump 34, in turn, inclined or pitched to drain from left to right, as viewed in FIG. 2, to a grease container means (not shown).

In the plan view of the plate means 14 of FIG. 3, it is apparent that the recesses 22 are joined by a series of straps 39 to provide rigidity.

In addition, the plate means includes an extension in the form of a smooth top griddle 41 encircled by a grease groove 42 pitched or inclined from a central point indicated by the reference numeral 43 to drain grease to the left and to the right as indicated by the arrows. The groove 42 drains into recesses indicated at 44 and 46 thereafter flowing downwardly into the grease troughs of the underlying grease collector means.

In the alternative, the griddle is designed to be separable from the plate means. In some embodiments of the invention the griddle is eliminated entirely.

The complete cooking plate and its griddle extensions are tied together by the encircling flange or rim 47 which provides additional rigidity and provides a retainer for items being cooked.

Note that the plate means 16 is fitted with at least one thermocouple T located in a central position on the underside of a land 21. As will be more apparent later, the thermocouple T is wired to a control unit for regulating flow when liquid or gaseous fuels are used.

FIGS. 7, 8, 9 and 10 deal with details of the grease collecting means showing, for example, the inclination or pitch of the grease troughs 18 as they fall off from the level at reference numeral 32 to the lower level at 33 where the grease drains into inclined sump 34 and thence to drain opening 48 and finally into removable container means 49.

Figure 11:
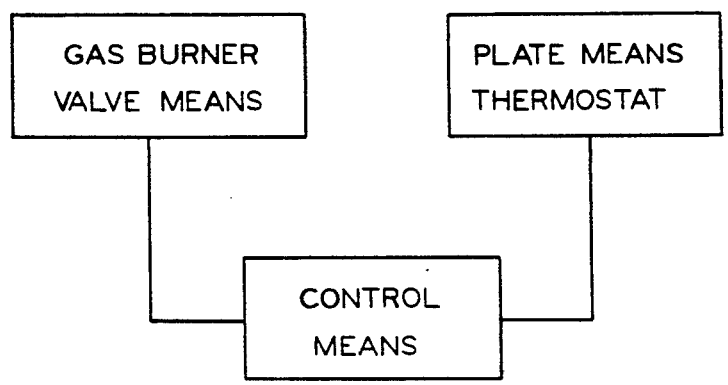
FIG. 11 is a schematic illustration of the control means used when the heat is supplied by bottled liquid or gas.
Figure 1A:
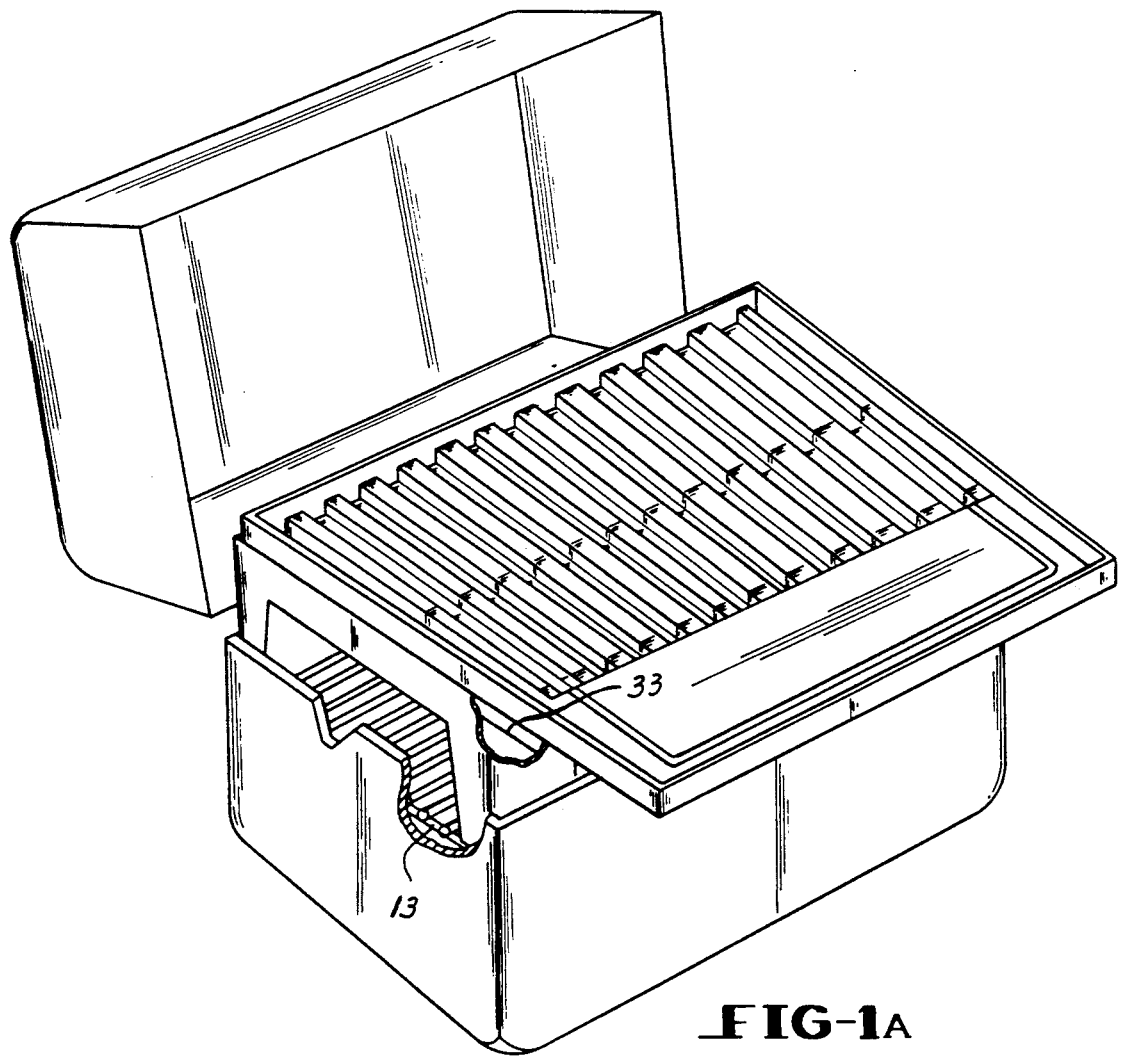
FIG. 1A is a perspective view showing an assembled plate means and grease collecting means of the present invention supported upon and spaced vertically from a grill grate of a conventional outdoor cooking device.

FIG. 11, shows schematically, control means responsive to plate means thermostat T (FIGS. 1 and 3) operative to regulate a flow control valve when the heat for cooking is generated by material as synthetic gas or other usual and customary liquid fuels.

It is to be understood that the combined plate means 16 defining a cooking unit in combination with separable grease collecting means 14 represents an assembly which can be adapted to an existing outdoor cooking unit by merely placing the assembly upon the existing grill or the assembly may be incorporated in a new firebox designed specifically for the assembly.

It is emphasized that proper vertical spacing as set forth in the descriptions of arrangements (1), (2) and (3) is critical to the maintenance of the temperature of the anti-stick coating of the cooking surface below 500° F. for the reasons already of record.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In combination, an outdoor cooking assembly comprising:

a cooking apparatus having a fire box containing means for generating heat;

support means disposed in said apparatus defining a first cooking surface;

portable and removable plate means providing a second cooking surface positioned above said support means and spaced vertically therefrom;

an anti-stick material covering said second cooking surface;

said anti-stick material tending to decompose issuing noxious fumes when overheated;

portable grease collecting means underlying said plate means;

said plate means defining a plurality of lands and recesses and said grease collecting means defining a plurality of lands and troughs;

strap means spanning said plate means generally perpendicular to said lands and joining said recesses to provide rigidity;

a strut means extending vertically from a central land of said grease collecting means in contact with the underside of a mating land of said plate means to act as a stiffener; and means for spacing said plate means and said grease collecting means apart vertically whereby the registration of the lands and grooves of the plate means and the lands and troughs of the grease collecting means operate to prevent overheating of the second cooking surface thereby precluding decomposition of said anti-stick material, said plate means and said grease collecting means being removable from said apparatus to convert said apparatus solely to said first cooking surface and said plate means and said grease collecting means being replaceable to provide said second cooking surface thereby providing an anti-stick cooking surface in said cooking apparatus.

2. The combination of claim 1 wherein the plate means is provided with handle means for lifting the plate means free of the grease collector means.

3. The combination of claim 1 wherein the first cooking surface is a grill.

4. The combination of claim 1 wherein the anti-stick material is selected from the group consisting of polymers of tetrafluoroethylene, and copolymers of tetrafluoroethylene and hexafluoropropylene.

5. The combination of claim 1 wherein the plate means includes a griddle means attached to a margin of said plate means.

* * * * *